United States Patent Office 3,803,183
Patented Apr. 9, 1974

3,803,183
PREPARATION OF 3-OXO-17α-PROPADIENYL-SUBSTITUTED STEROIDS
Imre Bacso, Morristown, N.J., assignor to
Sandoz Wander, Inc., Hanover, N.J.
No Drawing. Filed Jan. 10, 1973, Ser. No. 322,554
Int. Cl. C07c 169/22
U.S. Cl. 260—397.4     10 Claims

ABSTRACT OF THE DISCLOSURE

17α-propadienyl-substituted steroids, e.g. 17α-propadienylestra-4,9-dien-17β-ol-3-one, are prepared by a multistep procedure involving preparation of a 3-oxo-17α-dialkylaminopropynyl-, 17β-hydroxy steroid, which is converted to its corresponding 17α-propadienyl-3,17β-diol-steroid which is then oxidized at the 3-position.

---

This invention relates to a chemical process, and more particularly to a method of preparing 3-oxo-17α-propadienyl-substituted steroids.

3-oxo-17α-propadienyl-substituted steroids are known and are valuable compounds as they are useful as pharmaceuticals, as disclosed in the literature, e.g., Belgian Pat. 742,137. The methods described in the literature broadly involved preparing a 17α-dialkylaminopropynyl-17β-hydroxy-substituted steroid which was converted to the corresponding 17α-propadienyl - 17β-hydroxy-substituted steroid by treatment with a complex metal hydride reagent, such as lithium aluminum hydride. The methods described in the literature recommended that it was preferable to employ as intermediates "masked" or "protected" forms of the desired 3-oxo-substituted steroids for the reason that the complex hydride reagent used in converting the 17α-dialkylaminopropynyl-function could concurrently reduce a 3-oxo-function present on the steroid intermediate to a hydroxy function. Suitable protected forms of 3-oxo-4-mono-ethylenically unsaturated 19-unsubstituted steroids include their 3-methoxy-2,5-(10)-di-unsaturated analogs, while suitable protected forms of 3-oxo-4,9-di-ethylenically unsaturated-steroids include their 5(10), 9(11)-diene 3,3-ketal analogs. "Unmasking" or "deprotection" of such forms conventionally involves acid-hydrolysis of the ketal or ether function alone and rearrangement of the one or two double bonds to the desired locations under the acidic or basic conditions. The preparation of such protected forms from suitable starting compounds and the subsequent deprotection procedures entail expenditures of time and costs, and its advantageous to avoid such operations where possible. This invention provides a procedure for preparing gonene compounds of the Formula I, (I)
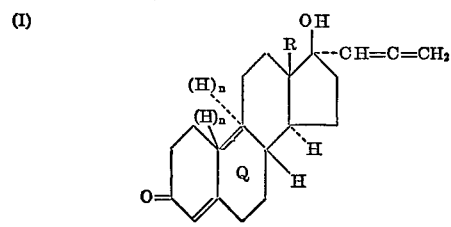

wherein:
Q is a single or double bond;
R is alkyl having 1 to 3 carbon atoms, i.e., methyl, ethyl, n-propyl or isopropyl, but is preferably unbranched and more preferably is methyl; and
$n$ is 0 when Q is a double bond and 1 when Q is a single bond.

Compounds I include 2 classes of compounds depending upon the nature of Q, i.e. (Ia) where Q is a single bond and (Ib) when Q is a double bond, which compounds are conveniently represented by the structural formulae given below wherein R is as defined above:

(Ia)
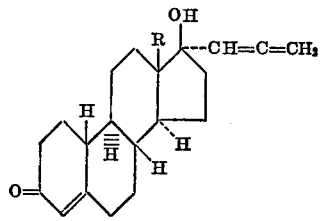

(Ib)
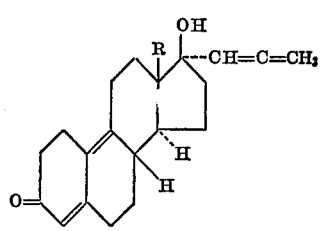

Compounds of Formula I are obtained by oxidation (process a) of the 3-hydroxy function of a compound of Formula II (II)
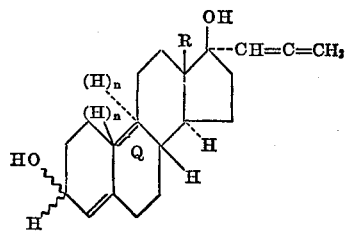

wherein R, Q and $n$ are as defined above.

Compounds of Formula II are preferably obtained by reducing (process b) a quaternary ammonium salt, i.e. a compound of Formula III (III)
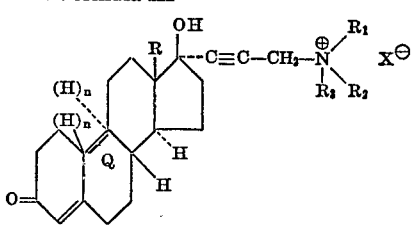

wherein:
R, Q and $n$ are as defined above and either $R_1$ and $R_2$, which may be the same or different, each signify an alkyl radical of 1 to 3 carbon atoms,
or $R_1$ and $R_2$, together with the nitrogen atom to which they are attached, form a pyrrolidino, piperidino, or homopiperidino radical,
$R_3$ signifies and alkyl radical of 1 to 3 carbon atoms, and
$X^\ominus$ signifies the anionic residue of a mineral or organic sulphonic acid, other than a fluoride ion, using a hydride ion source selected from compounds of Formula IVa

(IVa)

in which:

Y signifies an alkali or alkaline earth metal,
M signifies aluminum, or gallium, and $Z_1$, $Z_2$ and $Z_3$, which may be the same or different, each signify a hydrogen atom, an alkyl or alkoxy radical of 1 to 6 carbon atoms or an alkoxyalkoxy radical wherein the alkyl portion has from 1 to 6 carbon atoms and alkylene portion has from 2 to 6 carbon atoms, and compounds of Formula IVb

in which:

M is as defined above, and $Z_4$ and $Z_5$, which may be the same or different, each signify a hydrogen atom or an alkyl radical of 1 to 6 carbon atoms, in an aprotic medium not detrimental to the reaction.

The alkyl and alkoxy radicals mentioned above in connection with compounds of Formula III, IVa and IVb are understood to include as the alkyl portion thereof methyl, ethyl, propyl, butyl, amyl and hexyl, including isomers where such exist, but are preferably unbranched; and the alkylene radicals are understood to include ethylene, n-propylene, n-butylene, n-amylene and n-hexylene radicals.

Compounds of Formula III are obtainable by quaternization (process c) of a corresponding 17α-propynylamino bearing steroid, i.e., a compound of Formula V

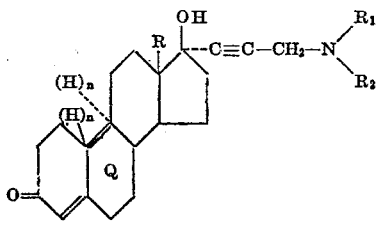

in which R, Q, n, $R_1$ and $R_2$ are as defined above, with a compound of Formula VI (VI)        $R_3X$ in which $R_3$ and X are as defined above.

Compounds of Formula V are obtained by treating by a Mannich-type reaction (process d) a 17α-ethynyl 17β-hydroxy-steroid of the Formula VII

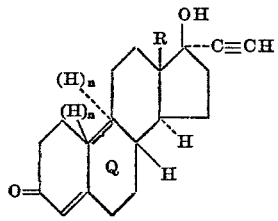

in which R, Q and n are as defined above, with an aminomethanol, i.e. a compound of Formula VIII (VIII)

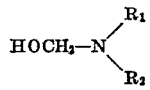

in which $R_1$ and $R_2$ are as defined above, in the presence of a monovalent coinage metal ion, i.e., Cu(I), Au(I) or Ag, preferably Cu(I).

Reagents and starting materials used in the process of this invention, e.g. compounds of Formulae IVa, IVb, VI, VII, and VIII are known and may be prepared by methods described in the literature, or where not known, may be prepared by methods analogous to those for preparing the known compounds. Many of these compounds are obtainable commercially.

In process (a), the oxidation of the 3-hydroxy function to an oxo function may be carried out in conventional manner. Suitable oxidizing agents include quinones, such as p-benzoquinone, chloranil, or 2,3-dicyano-5,6-dichlorobenzoquinone, (DDQ) and activated manganese dioxide, preferably 2,3-dicyano-5,6-dichlorobenzoquinone. The oxidation is preferably carried out at a temperature of from 10° to 50° C., more preferably from 20° to 30° C. Preferably an inert solvent, e.g. a cyclic ether such as dioxane, or a tertiary alkanol such as t-butanol, is employed.

The compounds of Formula I may be isolated and purified in conventional manner.

nI process (b), the aprotic medium may, for example, be an ether, such as diethyl ether, tetrahydrofuran or dioxane, or an aromatic compound such as benzene, toluene or pyridine. The medium may be a single material or a mixture. A suitable reaction temperature is from −40° to +120° C., e.g. the boiling temperature of the reaction mixture. Preferred reaction temperatures, however, are from −10° to +50° C. Whilst higher temperatures result in faster reaction rates, lower temperatures tend to give purer products. It is preferable to exclude moisture from the reaction mixture.

As representative of hydride ion sources may be given lithium aluminium hydride, sodium dihydro bis-(2-methoxy ethoxy) aluminate, lithium gallium hydride, magnesium aluminium hydride, lithium diisobutylmethyl aluminium hydride, lithium trimethoxy aluminium hydride and diethyl aluminium hydride, lithium aluminium hydride and sodium dihydro bis-(2-methoxy ethoxy) aluminate being preferred. In the Formula IVa, given above, although, as will be appreciated, alkaline earth metals are divalent, $Y^⊕$ has, for the sake of simplicity, been shown as monovalent. As examples of significances of Y may be given lithium, potassium, calcium and magnesium.

Process (c), the quaternization, may be carried out in conventional manner for preparing a quaternary ammonium salt from a tertiary amine. A suitable reaction temperature is from −20° to 100° C. Where a compound of Formula VI is liquid under the reaction conditions, such may be used in excess to serve as reaction medium. Alternatively, a solvent, such as acetone or acetonitrile may be used. Ions suitable as X include a monovalent ion of a halogen atom having an atomic weight of from 34 to 128; i.e., chloro, bromo, or iodo, or the residue of a sulfonic acid, e.g. of an alkylsulfonic acid such as a mesylate ion, or of an aromatic sulfonic acid, such as a tosylate ion, or the like. Preferred compounds of Formula VI are methyl iodide and methyl p-toluenesulphonate.

Process (d) is conveniently carried out at a temperature of from 20° to 80° C., preferably from 20° to 30° C. The reaction may be carried out in a solvent, e.g. in an ether such as diethylether, tetrahydrofuran or p-dioxane, and in the presence of a salt, adduct or complex of copper, silver or gold capable of providing monovalent ions under the reaction conditions. As examples of suitable salts may be given cuprous chloride, cuprous bromide, cuprous nitrate, cuprous acetate, silver or gold (I) chloride or bromide, or silver nitrate; cuprous chloride being preferred. As examples of complexes may be given copper, silver and gold cyanides. Where any of the reactants is liquid under the reaction conditions, such may be used in excess to serve as reaction medium. A preferred solvent is p-dioxane. A preferred Compound VIII is dimethylaminomethanol.

Compounds of Formula II employed in process (a) are mixtures of 3α,17β-diols and 3β,17β-diols. Such a mixture results from the reduction of the 3-oxo function of a compound of Formula III during process (b). In process (a) the 3-hydroxy function of a compound of Formula II is oxidized to an oxo function regardless of its isomeric configuration. Hence the proportion of 3α- to 3β-hydroxy isomers constituting a compound of Formula II employed in process (a) is unimportant, and represents an advantage of the invention.

The above-described Compounds I are useful because they possess pharmacological properties in animals. In particular, such compounds are useful as fertility control agents in warm-blooded animals as they possess progestational activity as indicated by standard tests, such as the Clauberg test, e.g. the method basically described in Endocrinology 63 (1958) 464 wherein the rabbit is given 0.0025 to 1.0 milligram of active agent.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.0025 milligram to 30 milligrams. It will be appreciated by those skilled in the art, that the daily dosage level is independent of body weight. Dosage forms suitable for internal administration comprise from about 0.0025 milligram to about 30 milligrams of the compound in admixture with a solid or liquid pharmaceutical carrier or diluent.

The compounds of Formula I are also useful as menstrual function regulating agents and as estrus regulating and controlling agents. For the above mentioned uses the compounds of Formula I may be administered alone in the manner and dosage described above, or in combination with a suitable estrogenic agent, the latter for example at a dosage of about 0.1 mg. For the regulation of the menstrual function, the estrogenic agent may be admixed with a compound of Formula I or alternatively the estrogenic agent may be administered alone in the first part of the menstrual cycle, and in admixture with the compound of Formula I in the latter days of the cycle.

A representative formulation suitable for oral administration is a tablet prepared by standard tabletting techniques which contained the following:

| Ingredients: | Part by weight, (mg.) |
|---|---|
| 17α-propadienylestra-4,9-dien-17β-ol-3-one | 0.05 |
| Tragacanth | 2 |
| Lactose | 89.45 |
| Corn starch | 5 |
| Talcum | 3 |
| Magnesium stearate | 0.50 |

This invention is illustrated but not limited by the following examples, wherein all temperatures are centigrade and room temperature is 20° to 30° C., unless indicated otherwise.

EXAMPLE 1

17α-propadienylestra-4,9-dien-17β-ol-3-one

Step A.—17α-(3' - dimethylamino-prop - 1'-yl-1'-yl)-estra-4,9-dien-17β-ol-3-one: 326 g. of 17α-ethynylestra-4,9-dien-17β-ol-3-one is dissolved in 3.26 liters of p-dioxane, and 29 g. of cuprous chloride then added thereto and stirred for 5 minutes at room temperature. 290 ml. of dimethylaminomethanol is then added and the mixture stirred for 45 minutes. While stirring is continued, 12 liters of water is slowly added. 6 liters of saturated aqueous sodium chloride solution is then added and stirring continued for 30 minutes, resulting in separation of the reaction product as crystals. The crystalline product is recovered by filtration, washed with 5 liters of water, then dried under vacuum, to obtain 17α-(3'-dimethylamino-prop-1'-yn-1'-yl)-estra-4,9-dien-17β-ol-3-one, M.P. 147–151° C.

Step B.—17α-(3' - dimethylamino - prop - 1' - yn-1'-yl) estra-4,9-dien-17β-ol-3-one methyl iodide: To 375.5 g. of the product of Step A, above is added 6 liters of acetone and the mixture stirred for 30 minutes at 40°. 50 g. of celite (diatomaceous earth) is then added. While warm, the mixture is filtered, and the filter cake washed with 600 ml. of acetone. The combined filtrate and wash are cooled to room temperature, then 106 ml. of methyl iodide is added thereto with stirring, and stirring is continued for 30 minutes. With stirring, 7 liters of diethyl ether are then added. The mixture is then cooled in an ice bath with stirring for 30 minutes, resulting in separation of the product as crystals, which are recovered by filtration. The crystalline product is washed with 1 liter of diethyl ether, and then dried at room temperature under vacuum to obtain the title methyl iodide salt, M.P. 213 to 215° (which should be protected from light).

Step C.—17α-propadienylestra-4,9-diene-3,17β-diol: A suspension is formed by mixing 480 g. of the product of Step B with 14.4 liters of dry tetrahydrofuran (THF) with vigorous stirring. 600 ml. of a 70% benzene solution of sodium bis(2-methoxyethoxy)aluminum hydride (w./v.) is diluted with dry THF to 1200 ml. and is added to the stirred suspension over a period of 30 minutes at room temperature. Stirring is then continued for 6 hours. With vigorous stirring, 575 ml. of water is slowly added to the reaction mixture, so that the temperature does not rise above 35°. Stirring is then continued for 3 hours. 100 g. of celite is then added to the reaction mixture which is then filtered, and the filter cake washed with 3 liters of THF. The combined filtrate and wash are then neutralized with glacial acetic acid (about 200 ml.). The neutralized solution is then concentrated under vacuum, displacing the THF with 5 liters of methyl isobutyl ketone (MIBK). The MIBK solution is washed first with 700 ml. water containing 10 g. of sodium thiosulfate, then with 700 ml. of water, and then twice with 500 ml. portions of saturated aqueous sodium chloride solution. The MIBK solution is then concentrated to a syrup under vacuum, and then maintained under high vacuum to remove residual solvents to obtain 17α-propadienylestra-4,9-dien-3,17β-diol as a yellow syrup.

Step O.—17α-propadienylestra-4,9-dien-17β - ol-3-one: 311 g. of the product of Step C are dissolved in 3.2 liters of p-dioxane, and 1300 ml. of a solution of 255 g. of 2,3-dichloro-5,6-dicyanobenzoquinone (DDQ) in p-dioxane, is slowly added thereto, with stirring, so that the temperature does not rise above 35°. Stirring is then continued at room temperature for 1.5 hours, resulting in the separation of a crystalline material. The crystalline material is collected on a fiter, and washed with 500 ml. of p-dioxane. The filtrate and wash are combined and, with stirring, 1.5 liters of an aqueous solution of 36.0 g. of sodium hydrosulfite and 76.0 g. of anhydrous potassium carbonate, added thereto. The mixture is then stirred for an additional 15 minutes, and then added to a mixture of 4 liters of saturated aqueous sodium chloride and 6 liters of water. The resulting mixture is then extracted 5 times with 1 liter portions of diethyl ether. The combined ether extracts are washed twice with 1 liter portions of saturated aqueous sodium chloride. The ethereal solution is concentrated, under vacuum, to obtain a syrup, from which residual p-dioxane is removed by high vacuum. The syrup is then dissolved in a minimum amount of diethyl ether, and the resulting solution charged to a column of 600 g. of aluminum oxide. The column is then washed with 4 liters of diethyl ether, which is then concentrated under vacuum to a volume of 1 to 1.5 liters. Crystals of the title product are obtained by cooling the concentrated solution in an ice bath. The crystalline product is recovered by filtration and washed with 300 ml. of an ice-cold mixture of hexane-ether (1:1) to obtain the refined product, M.P. 111 to 113°. Additional product can be recovered from the wash and filtrate, if desired.

EXAMPLE 2

17α-propadienylestra-4-en-17β-ol-3-one

Step A.—17α-(3' - dimethylamino - prop - 1' - yn-1'-yl)-estra-4-en-17β-ol-3-one: Repeating the procedure of Step A of Example 1, but replacing the 17α-ethynylestra-4,9-dien - 17β - ol - 3 - one used therein with an equivalent amount of 17α-ethynylestra-4-en-17β-ol-3-one, there is obtained 17α-(3'-dimethylamino-prop-1'-yn-1'-yl) - estra-4-en-17β-ol-3-one, from acetone-hexane: 1/1; M.P. 150–152° C.

Step B.—17α-(3' - dimethylamino - prop - 1' - yl-1'-yl) estra-4-en-17β-ol-3-one methyl iodide: Repeating the procedure of Step B of Example 1, but replacing the 17α-(3'-dimethylamino-prop-1'-yn-1'-yl)-estra - 4,9 - dien - 17β-ol-3-one used therein with an equivalent amount of 17α-(3'-dimethylamino-prop - 1' - yn - 1' - yl)-estra-4-en-17β-ol-3-one obtained in Step A, above, there is obtained 17α-(3'-dimethylamino-prop-1'-yn-1'-yl)estra - 4 en - 17β - ol-3-one methyl iodide.

Step C.—17α-propadienylestra - 4 -en - 3,17β - diol: Repeating the procedure of Step C of Example 1, but replacing the 17α - (3' - dimethylamino-prop-1'-yn-1'-yl)-estra - 4,9 - dien-17β-ol-3-one methyl iodide used therein with an equivalent amount of 17α - (3'-dimethylamino-prop-1'-ny-1'-yl)-estra-4-en-17β-ol-3-one methyl iodide obtained in Step B above, there is obtained 17α-propadienyl-estra-4-en-3,17β-diol.

Step D.—17α-propadienylestra - 4 - en - 17β - ol - 3-one: Repeating the procedure of Step D of Example 1, but replacing the 17α-propadienylestra-4,9-dien-3,17β-diol used therein with an equivalent amount of 17α-propadienylestra-4-en-3,17β-diol obtained in Step C above, there is obtained 17α-propadienylestra-4-en - 17β - ol - 3 - one, recrystallized from acetone-hexane (1:5) M.P. 140–144° C.

What is claimed is:

1. A method for the prepartion of a 3-oxo-compound of the formula

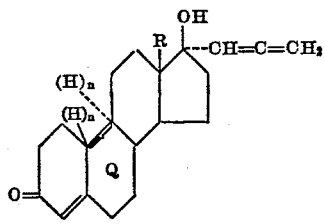

wherein:
R is alkyl having from 1 to 3 carbon atoms,
Q in a single or double bond; and
n is 0 when Q is a double bond and 1 when Q is a single bond, comprising (a) treating a quaternary ammonium salt of the formula

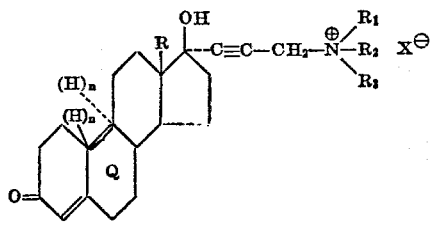

wherein:
n, R and Q are as defined above; and
ether $R_1$ and $R_2$, which may be the same or different, each signify an alkyl radical of 1 to 3 carbon atoms, or $R_1$ and $R_2$, together with the nitrogen atom to which they are attached, form a pyrrolidino, piperidino, or homopiperidino, radical,
$R_3$ signifies an alkyl radical of 1 to 3 carbon atoms, and $X^\ominus$ signifies the anionic residue of a mineral or organic sulphonic acid, other than a fluoride ion,
with a complex hydride selected from the group consisting of compounds of formula

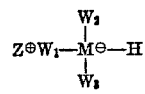

in which:
M represents an aluminum, or gallium atom,
Z represents an alkali metal or alkaline earth metal atom, and
$W_1$, $W_2$ and $W_3$ which may be the same or different, each represents a hydrogen atom, or an alkyl or alkoxy containing up to 6 carbon atoms, or an alkoxyalkoxy radical wherein the alkyl and alkylene portions each contain up to 6 carbon atoms.

and compounds of the formula

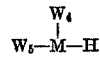

in which:
M is as defined above, and
$W_4$ and $W_5$, which may be the same or different, each signifies a hydrogen atom or an alkyl radical containing from 1 to 6 carbon atoms, to obtain a 3-hydroxy compound of the formula

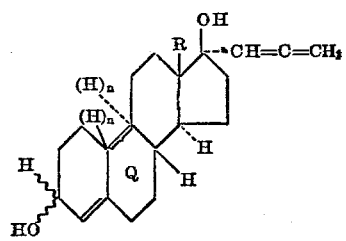

wherein n, R and Q are as defined above, and (b) oxidizing the 3-hydroxy-compound.

2. A method of claim 1, in which the oxidation is carried out in the presence of 2,3-dichloro-5,6-dicyanobenzoquinone, at from about 10° to 50° C. in an inert solvent.

3. A method of claim 1 wherein the 3-oxo-compound prepared in 17α-propadienylestra-4,9-dien-17β-ol-3-one.

4. A method of claim 1 wherein the 3-oxo-compound prepared is 17α-propadienylestra-4-en-17β-ol-3-one.

5. A method of claim 2 wherein the oxidation is carried out at from about 20° to 30° C.

6. A method of claim 5 wherein R is methyl.

7. A method of claim 6 wherein each of $R_1$, $R_2$ and $R_3$ is methyl and X is iodo.

8. A method of claim 7 wherein the complex hydride is sodium dihydro bis(2-methoxyethoxy) aluminate.

9. A method of claim 8 wherein n is 0.

10. A method of claim 8 wherein n is 1.

References Cited
FOREIGN PATENTS
2,119,327   4/1971   Germany _____ 260—239.55 C HENRY A. FRENCH, Primary Examiner U.S. Cl. X.R.

260—397.5; 424—243